United States Patent
Nomura et al.

(10) Patent No.: US 9,234,113 B2
(45) Date of Patent: Jan. 12, 2016

(54) DISPERSION OF PARTICLES OF RUTILE TITANIUM OXIDE, PROCESS FOR PRODUCING THE SAME, AND USE OF THE SAME

(75) Inventors: Atsushi Nomura, Sakai (JP); Kenichi Nakagawa, Sakai (JP); Takanori Morita, Sakai (JP)

(73) Assignee: SAKAI CHEMICAL INDUSTRY CO., LTD., Osaka (JP)

( * ) Notice: Subject to any disclaimer, the term of this patent is extended or adjusted under 35 U.S.C. 154(b) by 340 days.

(21) Appl. No.: 13/202,404

(22) PCT Filed: Feb. 15, 2010

(86) PCT No.: PCT/JP2010/052573
§ 371 (c)(1),
(2), (4) Date: Aug. 19, 2011

(87) PCT Pub. No.: WO2010/095726
PCT Pub. Date: Aug. 26, 2010

(65) Prior Publication Data
US 2011/0301270 A1    Dec. 8, 2011

(30) Foreign Application Priority Data
Feb. 19, 2009   (JP) ................................. 2009-036491

(51) Int. Cl.
C09D 17/00 (2006.01)
B82Y 30/00 (2011.01)
C01G 23/053 (2006.01)

(52) U.S. Cl.
CPC ............ C09D 17/008 (2013.01); B82Y 30/00 (2013.01); C01G 23/053 (2013.01);
(Continued)

(58) Field of Classification Search
CPC .. B82Y 30/00; C01G 23/053; C01G 23/0536; C01P 2002/72; C01P 2004/64; C01P 2006/12; C01P 2006/37; C09D 17/008; Y10T 428/2982
USPC ........................................................ 106/436
See application file for complete search history.

(56) References Cited

U.S. PATENT DOCUMENTS

2007/0144076 A1*  6/2007  Schumacher et al. .......... 51/309
2007/0277872 A1   12/2007  Cassaignon et al.

FOREIGN PATENT DOCUMENTS

| JP | 11-43327 | 2/1999 | |
| JP | 2006-335619 | * 12/2006 | ........... C01G 23/053 |
| JP | 2008-506627 | 3/2008 | |

OTHER PUBLICATIONS

Written Opinion of the International Searching Authority mailed May 18, 2010 in International (PCT) Application No. PCT/JP2010/052573 (with English translation).

(Continued)

*Primary Examiner* — Shuangyi Abu Ali
(74) *Attorney, Agent, or Firm* — Wenderoth, Lind & Ponack, L.L.P.

(57) ABSTRACT

The invention provides a dispersion of particles of rutile titanium oxide wherein the particles of rutile titanium oxide have a D50 in a range of 1 to 15 nm and a D90 of 40 nm or less in particle size distribution as determined by a dynamic light scattering method; a specific surface area in a range of 120 to 180 m²/g as determined by a BET method; and a rate of weight loss of 5% or less as obtained by heating the particles of rutile titanium oxide from 105° C. to 900° C.

Such a dispersion of particles of rutile titanium oxide is obtained by a process according to the invention, which comprises: a first step in which an aqueous titanium tetrachloride solution is heated and hydrolyzed to obtain a slurry containing the precipitated particles of rutile titanium oxide; a second step in which the slurry obtained in the first step is filtered and washed with water to remove water-soluble salts dissolved therein from the slurry; a third step in which the slurry obtained in the second step is subjected to a hydrothermal reaction in the presence of an organic acid; a fourth step in which the slurry obtained in the third step is filtered and washed with water; a fifth step in which an acid is added to the slurry obtained in the fourth step, and the resulting mixture is subjected to a wet dispersion treatment, thereby obtaining a dispersion; and a sixth step in which excess acid and water-soluble salts are removed from the dispersion obtained in the fifth step.

12 Claims, 1 Drawing Sheet

(52) U.S. Cl.
CPC ........ *C01G 23/0536* (2013.01); *C01P 2002/72* (2013.01); *C01P 2004/64* (2013.01); *C01P 2006/12* (2013.01); *C01P 2006/37* (2013.01); *Y10T 428/2982* (2015.01)

(56) References Cited

OTHER PUBLICATIONS

Li Y et al., A novel method for preparation of nanocrystalline rutile $TiO_2$ powders by liquid hydrolysis of $TiCl_4$, Journal of Materials Chemistry, 2002, vol. 12, No. 5, pp. 1387-1390.

Aruna ST et al., Nanosize rutile titania particle synthesis via a hydrothermal method without mineralizers, Journal of Materials Chemistry, 2000, vol. 10, pp. 2388-2391.

Kominami H et al., "Rutile-gata Sanka Titanium Nano Kessho no. Gosei to sono Hikari Shokubai Tokusei", Shokubai Toronkai Toronkai A yokoshu, 2002, p. 353.

Jiang B et al., Hydrothermal synthesis of rutile $TiO_2$ nanoparticles using hydroxyl and carboxyl group-containing organics as modifiers, Materials Chemistry and Physics, 2006, vol. 98 No. 2-3, pp. 231-235.

Jiang Y et al., Effects of organic acids on the size-controlled synthesis of rutile $TiO_2$ nanorods, Applied Surface Science, 2007, vol. 253, No. 23, pp. 9277-9282.

* cited by examiner

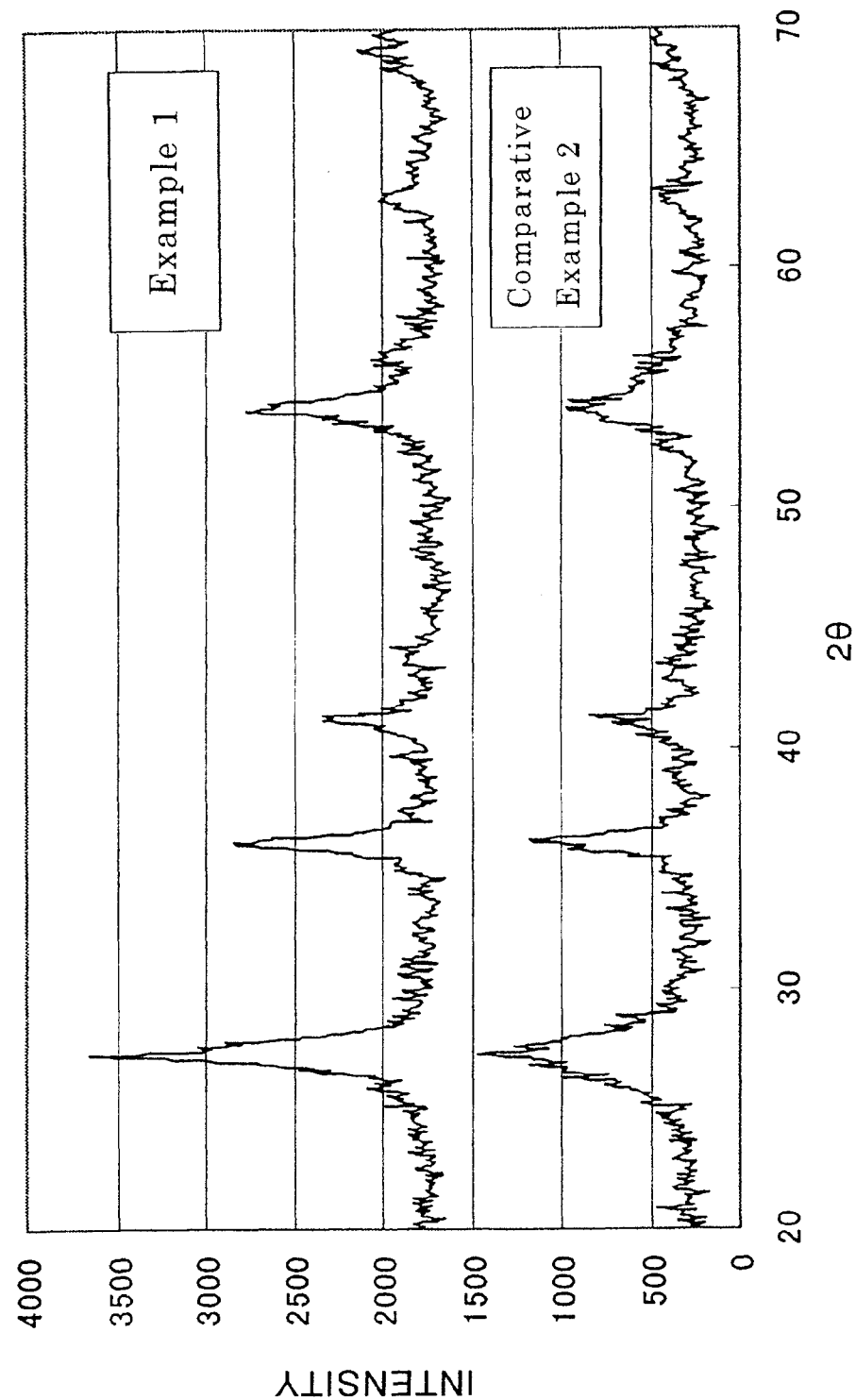

DISPERSION OF PARTICLES OF RUTILE TITANIUM OXIDE, PROCESS FOR PRODUCING THE SAME, AND USE OF THE SAME

TECHNICAL FIELD

The present invention relates to a dispersion of particles of rutile titanium oxide, a process for producing the same, and use of the same, particularly use for a resin composition.

BACKGROUND ART

Many processes for producing a dispersion of rutile titanium oxide particles are already conventionally known. The most general process is the one in which a titanium salt is hydrolyzed to prepare slurry of hydrous titanium oxide, and the slurry is peptized with an acid or an alkali to obtain a dispersion. However, the particles of titanium oxide in the dispersion of rutile titanium oxide obtained in this conventionally known process have a D90 of 40 nm or more, and therefore they cannot be used in such an application of a resin molding or a coating agent for hard coating where the particles are required to have a high transparency.

Recently, some processes for producing a dispersion of fine particles of rutile titanium oxide are proposed. For example, a process is proposed in which titanium tetrachloride and hydrochloric acid are mixed in water having a temperature of 65 to 90° C., and the mixture is heated to a temperature of 65° C. to a boiling point of the resulting mixture to hydrolyze the titanium tetrachloride, thereby a dispersion of particles of rutile titanium oxide is obtained (JP 2006-335619A). According to this process, a dispersion of fine particles of rutile titanium oxide having a BET specific surface area within a range of 50 to 300 $m^2/g$ can be obtained, but the process has a defect in which the particles of titanium oxide have a low crystallinity. In general, the higher the crystallinity of the particles, the more effective the exhibition of various physical properties of the rutile titanium oxide such as UV shielding property, photocatalytic activity, and a refractive index, and hence the higher crystallinity is preferable. The increase of the crystallinity can be confirmed by increase of peak intensity of a powder X-ray diffraction without being accompanied by particle growth.

Furthermore, it is believed that the particles of rutile titanium oxide obtained by thermal hydrolysis of titanium tetrachloride are not increased in crystallinity because an amorphous titanium compound is intermixed therein, and that there is a volatile component such as water which is contained in or adheres to the particles. For comparison of the amounts of the amorphous titanium compounds, variations in weight loss on heating may be compared. It can be said the smaller the weight loss on heating, the higher the crystallinity.

It is traditionally known that the crystallinity of the rutile titanium oxide can be increased by calcining it, but when the oxide is calcined, the particles grow at the same time, and therefore the crystallinity cannot be increased while the particles remain fine. To be highly crystalline is traded off against to be fine in particle size.

As another process for producing a dispersion of fine particles of rutile titanium oxide, for example, a process is proposed in which fine particles of rutile titanium oxide which have been previously produced are dispersed in water (JP 07-232925A). According to this process, however, the particles of titanium oxide dispersed in water have a minimum average particle size of 70 nm.

SUMMARY OF INVENTION

Technical Problem

The present invention has been made in order to solve the above-mentioned problems in conventional dispersions of particles of rutile titanium oxide. Therefore, it is an object of the invention to provide a stable dispersion of fine particles of rutile titanium oxide and a process for producing the same. It is a further object of the invention to provide use of such a dispersion of particles of rutile titanium oxide, in particular, use in resin compositions such as resin moldings and coatings.

Solution to Problem

The invention provides a dispersion of particles of rutile titanium oxide wherein the particles of rutile titanium oxide have a D50 in a range of 1 to 15 nm and a D90 of 40 nm or less in particle size distribution as determined by a dynamic light scattering method; a specific surface area in a range of 120 to 180 $m^2/g$ as determined by a BET method; and a rate of weight loss of 5% or less as obtained by heating the particles of rutile titanium oxide from 105° C. to 900° C.

Such a dispersion of particles of rutile titanium oxide is obtained in accordance with a process of the invention, which comprises:

a first step in which after a chloride ion concentration of an aqueous titanium tetrachloride solution is adjusted to 4.4 mole/L or more, the solution is heated at a temperature in a range of 86° C. to a boiling point to hydrolyze the titanium tetrachloride, thereby obtaining a slurry containing the precipitated particles of rutile titanium oxide;

a second step in which the slurry obtained in the first step is filtered and washed with water to remove water-soluble salts dissolved therein from the slurry;

a third step in which the slurry obtained in the second step is subjected to a hydrothermal reaction in the presence of an organic acid;

a fourth step in which the slurry obtained in the third step is filtered and washed with water to remove water-soluble salts dissolved therein from the slurry;

a fifth step in which an acid is added to the slurry obtained in the fourth step, and the resulting mixture is subjected to a wet dispersion treatment, thereby obtaining a dispersion; and a sixth step in which excess acid and water-soluble salts are removed from the dispersion obtained in the fifth step.

Advantageous Effects of Invention

The dispersion of particles of rutile titanium oxide obtained according to the process of the invention has a higher crystallinity and a higher stability while the particle size is 15 nm or less as calculated from a BET specific surface area, as compared to the conventionally known dispersions obtained by thermal hydrolysis of titanium tetrachloride. Accordingly, for example, when the dispersion obtained according to the invention is mixed with and dispersed in a resin to give a resin composition, easy and uniform dispersion of titanium oxide can be realized compared to a case in which a titanium oxide powder is mixed with and dispersed in a resin. Thus, the moldings of the thus obtained resin composition can effectively exhibit the properties of the rutile titanium oxide particles such as UV shielding property, a high refractive index, and photocatalytic activity.

BRIEF DESCRIPTION OF DRAWING

FIG. 1 shows a powder X-ray diffraction pattern of particles of rutile titanium oxide obtained from a dispersion according to the invention, as compared with a powder X-ray diffraction pattern of particles of rutile titanium oxide as a comparative example.

DESCRIPTION OF EMBODIMENTS

According to the dispersion of particles of rutile titanium oxide of the invention, the particles of rutile titanium oxide have a D50 in a range of 1 to 15 nm and a D90 of 40 nm or less in particle size distribution as determined by a dynamic light scattering method; a specific surface area in a range of 120 to 180 m$^2$/g as determined by a BET method; and a rate of weight loss of 5% or less as obtained by heating the particles of rutile titanium oxide from 105° C. to 900° C.

The dispersion medium in the dispersion of particles of rutile titanium oxide may be water or an organic solvent.

Among the dispersions of particles of rutile titanium oxide, an aqueous dispersion is obtained by a process comprising the following steps according to the invention:

a first step in which after a chloride ion concentration of an aqueous titanium tetrachloride solution is adjusted to 4.4 mole/L or more, preferably 7.0 mole/L or more, the solution is heated at a temperature in a range of 86° C. to a boiling point to hydrolyze the titanium tetrachloride, thereby obtaining a slurry containing the precipitated particles of rutile titanium oxide;

a second step in which the slurry obtained in the first step is filtered and washed with water to remove water-soluble salts dissolved therein from the slurry;

a third step in which the slurry obtained in the second step is subjected to a hydrothermal reaction in the presence of an organic acid;

a fourth step in which the slurry obtained in the third step is filtered and washed with water to remove water-soluble salts dissolved therein from the slurry;

a fifth step in which an acid is added to the slurry obtained in the fourth step, and the resulting mixture is subjected to a wet dispersion treatment, thereby obtaining a dispersion; and a sixth step in which excess acid and water-soluble salts are removed from the dispersion obtained in the fifth step.

The water, which is the dispersion medium of the thus obtained aqueous dispersion of particles of rutile titanium oxide, may be displaced by an organic solvent in accordance with a conventionally known solvent displacement method, thereby a dispersion of particles of rutile titanium oxide whose dispersion medium is the organic solvent can be obtained.

The process for producing the aqueous dispersion of particles of rutile titanium oxide according to the invention will be explained below.

The first step is a step in which titanium tetrachloride is thermally hydrolyzed in water so that particles of rutile titanium oxide are precipitated, thereby a slurry containing such particles of rutile titanium oxide is obtained. In more detail, in the first step, water is added to the aqueous titanium tetrachloride solution so that it has a content of titanium oxide (TiO$_2$, hereinafter the same) in a range of 75 to 250 g/L, preferably 80 to 200 g/L, and a chloride ion concentration of 4.4 mole/L or more, preferably 7.0 mole/L or more. Subsequently, the aqueous solution is heated at a temperature of 86° C. to a boiling point for one to two hours so that the titanium tetrachloride is hydrolyzed and particles of rutile titanium oxide are precipitate. Upon such a hydrolysis of the titanium tetrachloride, if the chloride ion concentration of the aqueous titanium tetrachloride solution is less than 4.4 mole/L, the particles of rutile titanium oxide formed gets mixed undesirably with anatase titanium oxide. The hydrolysis rate of the titanium tetrachloride depends on the hydrolysis temperature, and the higher the temperature, the higher the hydrolysis rate. The higher temperature, therefore, is industrially advantageous.

The second step is a step in which the slurry obtained in the first step is filtered and washed with water to remove water-soluble salts dissolved therein from the slurry. In the second step, although the means and procedures for filtering and washing with water are not particularly limited, when a suitable alkali is added to the slurry before the filtration to adjust the pH of the slurry to an isoelectric point of titanium oxide, the slurry can be efficiently filtered and washed with water.

The third step is a step in which the slurry obtained in the second step is subjected to hydrothermal reaction in the presence of an organic acid, which is a particle growth inhibiting agent, to increase the crystallinity of particles of the rutile titanium oxide, while the particle growth is inhibited. As the organic acid, carboxylic acids and hydroxycarboxylic acids are used, and their salts may also be used. Concrete examples of the organic acid may include monocarboxylic acids such as formic acid, acetic acid, and propionic acid, and their salts; polybasic acids such as oxalic acid, malonic acid, succinic acid, fumaric acid, and maleic acid, and their salts; hydroxycarboxylic acids such as lactic acid, malic acid, tartaric acid, citric acid, and gluconic acid, and their salts. As the salts of the carboxylic acid and the hydroxycarboxylic acid, for example, alkali metal salts such as sodium salts and potassium salts are preferably used.

According to the invention, when the organic acid is used in an amount of 75 parts by mole or more per 100 parts by mole of titanium oxide, the crystallinity of particles of rutile titanium oxide obtained by the hydrothermal reaction can be effectively increased. When the amount of the organic acid is less than 75 parts by mole per 100 parts by mole of titanium oxide, the effect for inhibiting the growth of particles of rutile titanium oxide cannot be obtained in the hydrothermal reaction. A preferred amount of the organic acid is 85 parts by mole or more per 100 parts by mole of titanium oxide. On the other hand, the upper limit of the amount of the organic acid relative to the titanium oxide is not particularly limited, but even if a too much amount of the organic acid is used, the effect for increasing the crystallinity of particles of rutile titanium oxide is not improved any more. Therefore, an amount of 200 parts by mole or less of the organic acid per 100 parts by mole of the titanium oxide is usually enough.

Further according to the invention, the temperature of the hydrothermal reaction is in a range of 120 to 180° C. When the temperature of the hydrothermal reaction is lower than 120° C., the crystallinity of particles of rutile titanium oxide cannot be increased. On the other hand, when it is higher than 180° C., the particles grow remarkably. That is, it becomes difficult to increase the crystallinity while the particle growth is inhibited. In particular, according to the invention, it is advantageous to perform the hydrothermal reaction at a temperature in a range of 140 to 160° C. because not only the crystallinity of particles of rutile titanium oxide is increased while the growth of particles of rutile titanium oxide is inhibited, but also the effects described above can be obtained in a short time.

The fourth step is a step in which the slurry obtained by the hydrothermal reaction is filtered and washed with water to remove water-soluble salts dissolved therein from the slurry. In the fourth step, the means and procedures for filtering and washing with water are not also particularly limited, but the filtration and washing with water can be efficiently performed by adding a suitable alkali to the slurry before the filtration to adjust the pH of the slurry to an isoelectric point of titanium oxide. In the fourth step, it is preferable that the slurry is filtered and the washed with water so that the slurry has an electric conductivity is 100 μS/cm or less when the slurry is repulped so as to have a concentration of the rutile titanium oxide particles of 100 g/L.

The fifth step is a step in which after an acid is added to the slurry obtained in the fourth step, the resulting mixture is subjected to a wet dispersion treatment to obtain a dispersion. That is, in the fifth step, the acid is added to the slurry obtained in the fourth step to peptize the particles of rutile titanium oxide, and at the same time, preferably, a wet dispersion treatment is performed to obtain a dispersion of particles of rutile titanium oxide. The acid used for the peptization may be an inorganic acid or an organic acid. As the inorganic acid, for example, nitric acid and hydrochloric acid are preferable. As the organic acid, for example, monocarboxylic acids such as formic acid, acetic acid, and propionic acid; polybasic acids such as oxalic acid, malonic acid, succinic acid, fumaric acid, and maleic acid; and hydroxycarboxylic acids such as lactic acid, malic acid, tartaric acid, citric acid, and gluconic acid are preferable.

The acid is used usually in an amount of 15 to 60 parts by mole, preferably 20 to 50 parts by mole, per 100 parts by mole of titanium oxide.

The wet dispersion may be performed in a general manner, and for example a bead mill is preferably used. Beads having a Mohs hardness higher than titania are preferable, and for example zirconia beads are preferably used. In a preferred embodiment, a slurry and zirconia beads having a diameter of 15 to 300 μm and the same volume as that of the slurry are placed in a bead mill, and the dispersion treatment is performed for several hours, for example, 4 hours, thereby providing a dispersion of particles of the rutile titanium oxide.

The sixth step is a step in which water-soluble salts dissolved in the dispersion obtained in the fifth step is removed therefrom in order to make the dispersion stable. The means and procedures for removing the water-soluble salts dissolved in the dispersion are not particularly limited. For example, a dialysis or ultrafiltration or the like may be made use of. The dispersion obtained in the fifth step contains the acid described above, or a peptizer, and thus the electric conductivity thereof is usually higher than 10 mS/cm. In the sixth step, however, the electric conductivity of the dispersion is adjusted to a range of 0.1 to 5 mS/cm, preferably 1 to 3 mS/cm, thereby a dispersion having a high stability of particles of the rutile titanium oxide can be obtained.

As described above, according to the invention, titanium tetrachloride is thermally hydrolyzed in an aqueous solution so that fine particles of rutile titanium oxide are precipitated; the fine particles are subjected to a hydrothermal treatment in the presence of an organic acid so that the crystallinity of the particles is increased while inhibiting the particle growth; subsequently an acid is added to the thus obtained slurry of particles of rutile titanium oxide so that it is peptized, and the resulting slurry is preferably subjected to wet dispersion treatment to obtain a dispersion of particles of rutile titanium oxide; and the excess acid and water-soluble salts dissolved in the dispersion are removed, thereby a dispersion in which fine particles of rutile titanium oxide are stably dispersed in water without causing aggregation can be obtained.

The thus obtained dispersion of particles of rutile titanium oxide according to the invention has a D50 in a range of 1 to 15 nm and a D90 of 40 nm or less in particle size distribution as determined by a dynamic light scattering method, and the particles of rutile titanium oxide have a specific surface area in a range of 120 to 180 m$^2$/g as determined by a BET method, but because the dispersion has a high crystallinity and a high dispersion stability, the particles of rutile titanium oxide have a rate of weight loss of 5% or less when they are heated at a temperature from 105° C. to 900° C.

Consequently, when the dispersion of particles of rutile titanium oxide according to the invention is, for example, mixed with and dispersed in a resin to give a resin composition, easy and uniform dispersion of titanium oxide can be realized compared to a case in which a titanium oxide powder is mixed with and dispersed in a resin, and the moldings of the thus obtained resin composition can effectively exhibit the properties of particles of rutile titanium oxide such as UV shielding property, a high refractive index, and photocatalytic activity.

If necessary, when the dispersion medium, that is, water, of the thus obtained dispersion of particles of rutile titanium oxide is displaced by an organic solvent using a conventionally known solvent displacement method, a dispersion whose dispersion medium is the organic solvent can be obtained. The organic solvent used is not particularly limited, and preferable ones are water-miscible organic solvents. The water-miscible organic solvents are not particularly limited, and examples thereof include aliphatic alcohols such as methanol, ethanol, and 2-propanol; aliphatic carboxylic acid esters such as ethyl acetate and methyl formate; aliphatic ketones such as acetone, methyl ethyl ketone, and methyl isobutyl ketone; polyhydric alcohols such as ethylene glycol and glycerine; and mixtures of two or more of these. Methanol, methyl ethyl ketone, methyl isobutyl ketone, and the mixture thereof are particularly preferable.

The water as the dispersion medium of the dispersion of particles of rutile titanium oxide can be displaced by an organic solvent by adding the organic solvent to the aqueous dispersion while the dispersion is distilled to remove the water as the dispersion medium; by distilling the aqueous dispersion to remove the water as the dispersion medium from the dispersion, and then adding an organic solvent to the dispersion to dilute it, and repeating such concentration and dilution; or by subjecting the aqueous dispersion to ultrafiltration to remove the water as the dispersion medium, and then adding an organic solvent to the dispersion to dilute it, and repeating such concentration and dilution. In this way, the water which is the original dispersion medium can be displaced by an organic solvent to obtain a dispersion of particles of rutile titanium oxide whose dispersion medium is the organic solvent.

It is also possible that the water as the dispersion medium of the dispersion of particles of rutile titanium oxide is displaced by a water-miscible organic solvent to obtain a dispersion whose dispersion medium is the water-miscible organic solvent, and then the water-miscible organic solvent is displaced by yet another organic solvent to obtain a dispersion whose dispersion medium is the other organic solvent.

Although depending on resins used, the dispersion of particles of rutile titanium oxide of the invention, preferably the dispersion whose dispersion medium has been changed to an organic solvent by the solvent displacement method can be suitably used in various resin compositions. That is, preferably the dispersion of particles of rutile titanium oxide whose dispersion medium is the organic solvent is mixed with a resin and the dispersion is uniformly dispersed in the resin, thereby a resin composition containing the particles of rutile titanium oxide can be obtained. The amount of the rutile titanium oxide to the resin depends on the use and the desired properties of the resulting resin composition, and it is usually within a range of 5 to 350 parts by weight per 100 parts by weight of the resin.

The above-mentioned resin may be appropriately selected depending on the use and the desired properties of the resulting resin composition, and concrete examples thereof may include polyolefin resins including homopolymers and copolymers of an olefin, such as polyethylene, polypropylene, ethylene-propylene copolymers, ethylene-propylene-diene monomer terpolymers, ethylene-butene copolymers, ethylene-acrylic acid ester (such as ethyl acrylate) copolymers, ethylene-vinyl acetate copolymers, and ethylene-methyl methacrylate copolymers; homopolymers of an aromatic vinyl monomer such as styrene and copolymers thereof such as ABS resins; poly(meth)acrylic resin; polyesters such as polyethylene terephthalate, polybutylene terephthalate, and polyarylate; polyamides such as 6-nylone, 6,6-nylone, 12-nylone, 46-nylone, and aromatic polyamides; polyethers such as polyphenylene ether, modified polyphenylene ether, and polyoxymethylene; polycarbonate; elastomers such as styrene-conjugated diene copolymers, polybutadiene, polyisoprene, acrylonitrile-butadiene copolymers, and polychloroprene; polyvinyl chloride, and the like. If necessary, thermosetting resins such as phenol resins, epoxy resins, unsaturated polyesters, and polyurethane, and silicone resins may also be used as the resin. These resins may be used alone or as a mixture of two or more kinds thereof.

The rutile titanium oxide-containing resin composition according to the invention may be appropriately blended with other additives depending on the resin, if necessary, in addition to the rutile titanium oxide described above. Such additives may include, for example, a plasticizer, a lubricant, a filler, an antioxidant, a heat stabilizer, a nucleating agent, a cross-linking agent, a cross-linking auxiliary agent, an anti-static agent, a compatibilizing agent, a light proofing agent, a pigment, a foaming agent, an anti-fungal agent, a coupling agent, and the like.

The resin composition can be obtained by mixing the dispersion of particles of rutile titanium oxide described above with the resin and kneading the mixture making use of an appropriate technique such as a stirring and mixing machine, a single screw extruder, a twin screw extruder, a roll kneader, a kneader, a Banbury mixer, a ball mill, or a bead mill. The thus obtained resin composition according to the invention can be preferably used for various moldings by an appropriate method such as an injection molding, an extrusion molding, a blow molding, a press molding, a vacuum forming, a calendar molding, a transfer molding, a laminate molding, a molding using a die, and a film forming method using a solution, depending on the use or purpose.

EXAMPLES

The invention will be explained with reference to Examples below, but the invention is not limited to these Examples at all. In the following Examples and Comparative Examples, physical properties of dispersions of particles of rutile titanium oxide obtained were evaluated as follows:
(Particle Size Distribution of Dispersion)

The particle size distribution was determined in accordance with a dynamic light scattering method using UPA-UT 151 manufactured by Nikkiso Co., Ltd. D50 is a particle size of a particle at which 50% by volume of particles is accumulated from the smallest particle side in a volume based particle size distribution, and D90 is a particle size of a particle at which 90% by volume of particles is accumulated from the smallest particle side in a volume based particle size distribution.
(Chloride Ion Concentration)

The chloride ion concentration was determined by using an F-50 series chlorine ion electrode manufactured by HORIBA, Ltd.
(Stability of Dispersion)

After a dispersion was allowed to stand at room temperature for one month, it was visually observed whether particles of titanium oxide have precipitated.

Furthermore, the obtained dispersion of particles of rutile titanium oxide was heated at 105° C. for 12 hours to remove water, and physical properties of the obtained particles of rutile titanium oxide were evaluated as follows:
(Crystal Structure of Particles)

The crystal structure of particles was determined by using a powder X-ray diffraction apparatus (RINT-TTR 3 manufactured by Rigaku Corporation) (Cu Kα radiation).
(Specific Surface Area of Particles)

The specific surface area of particles was determined in accordance with a BET method (multi-point nitrogen adsorption method) using GEMINI 2360 manufactured by Micro Meritics Instrument Corporation wherein degassing treatment was performed at 230° C. for 40 minutes as pretreatment.
(Weight Loss on Heating)

A weight was determined at 105° C. and at 900° C. using SSC5200 TG/DTA 320 manufactured by Seiko Instruments Inc., and a difference in weight was calculated.
(Transmittance and Haze Value of Thin Film)

A transmittance and a haze value of a thin film were determined using a Haze meter NDH-2000 manufactured by Nippon Denshoku Industries Co., Ltd.

Example 1

First Step

An aqueous solution of titanium tetrachloride was diluted with water so that it had titanium tetrachloride in an amount of 200 g/L in terms of titanium oxide and chloride ions in a concentration of 8.3 mole/L. One liter of the aqueous solution of titanium tetrachloride was placed in a separable flask equipped with a reflux apparatus, and it was heated at a boiling point (110° C.) for 2 hours so that the titanium tetrachloride is hydrolyzed, thereby a slurry containing precipitated particles of rutile titanium oxide was obtained.

Second Step

The slurry was filtered through a filter paper made of glass fiber having a collection diameter of 300 nm, and unreacted titanium tetrachloride and dissolved components were removed. The thus obtained particles of rutile titanium oxide were repulped in water, and an aqueous solution of sodium hydroxide was added to the obtained slurry until it had a pH of 7.0. The resulting slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 50 g/L in terms of titanium oxide, the resulting slurry had an electric conductivity of 100 μS/cm or less.

Third Step

The particles of rutile titanium oxide obtained in the second step was repulped in water so that the resulting slurry had a content of 50 g/L of rutile titanium oxide in terms of titanium oxide. Acetic acid was added to the slurry in an amount of 150 parts by mole per 100 parts by mole of the titanium oxide. The mixture was subjected to a hydrothermal reaction at 150° C. for 3 hours to increase the crystallinity of particles of rutile titanium oxide.

Fourth Step

An aqueous solution of sodium hydroxide was added to the slurry obtained by the hydrothermal reaction described above until the slurry had a pH of 5.0. The slurry was then filtered through a filter paper made of glass fiber having a collection diameter of 300 nm, whereupon the slurry was filtered and washed with water to remove water-soluble salts dissolved therein from the slurry so that when the particles of rutile titanium oxide obtained were repulped in water in an amount of 100 g/L in terms of titanium oxide, the resulting slurry had an electric conductivity of 100 μS/cm or less.

Fifth Step

The particles of rutile titanium oxide obtained in the fourth step were repulped in water so that the resulting slurry had a content of 100 g/L of rutile titanium oxide in terms of titanium oxide. Nitric acid was then added to the slurry in an amount of 30 parts by mole per 100 parts by mole of the titanium oxide to peptize the titanium oxide. Zirconia beads having a diameter of 100 μm were added to the thus obtained slurry in the same volume as that of the slurry, and wet dispersion treatment was performed for 4 hours using a planetary ball mill, thereby an aqueous dispersion of particles of rutile titanium oxide was obtained.

Sixth Step

The aqueous dispersion of particles of rutile titanium oxide was subjected to dialysis in order to remove excess nitric acid and water-soluble salts dissolved therein until the aqueous dispersion had an electric conductivity of 3.2 mS/cm, thereby a dispersion of particles of rutile titanium oxide was obtained.

The thus obtained dispersion was heated at 105° C. for 12 hours to remove water, thereby particles of rutile titanium oxide were obtained as powder. An X-ray diffraction diagram of the thus obtained powder of rutile titanium oxide is shown in FIG. 1. It is understood that the crystallinity of the particles of rutile titanium oxide is increased compared to particles of rutile titanium oxide of Comparative Example 2 described below.

Example 2

In the fifth step of Example 1, hydrochloric acid was used in place of nitric acid as a peptizer, and otherwise in the same manner as in Example 1, a dispersion of particles of rutile titanium oxide was obtained.

Example 3

In the third step of Example 1, acetic acid was added in an amount of 90 parts by mole per 100 parts by mole of titanium oxide, and otherwise in the same manner as in Example 1, a dispersion of particles of rutile titanium oxide was obtained.

Example 4

In the third step of Example 1, 150 parts by mole of sodium citrate per 100 parts by mole of titanium oxide was used in place of acetic acid, and in the fifth step of Example 1, 30 parts by mole of citric acid was used in place of 30 parts by mole of nitric acid, and otherwise in the same manner as in Example 1, a dispersion of particles of rutile titanium oxide was obtained.

Example 5

In the first step of Example 1, an aqueous solution of titanium tetrachloride was diluted with water so that it had titanium tetrachloride in an amount of 90 g/L in terms of titanium oxide and chloride ions in a concentration of 4.5 mole/L, and the aqueous solution of titanium tetrachloride was heated at a boiling point (110° C.) to hydrolyze the titanium tetrachloride, and otherwise in the same manner as in Example 1, a dispersion of particles of rutile titanium oxide was obtained.

Example 6

Preparation of Resin Composition Containing Particles of Rutile Titanium Oxide and Evaluation Thereof A dispersion of particles of rutile titanium oxide obtained in Example 1 was subjected to solvent displacement by ultrafiltration to obtain a dispersion of particles of rutile titanium oxide whose dispersion medium was methanol and whose content of rutile titanium oxide was 20% by weight.

4.4 parts by weight of 0.01N hydrochloric acid was added to 12.5 parts by weight of 3-glycidoxypropyltrimethoxysilane (KBM-403 manufactured by Shin-Etsu Chemical Co., Ltd.) and the resulting mixture was stirred for 24 hours. 62.5 parts by weight of the above-mentioned dispersion of particles of rutile titanium oxide, 15 parts by weight of propylene glycol monomethylether, 56 parts by weight of methanol, and a small amount of hardening agent (aluminum acetylacetonate) were added to the mixture, and stirred, thereby a coating agent for hard coating was obtained.

The coating agent was spin-coated on a slide glass plate at a rate of 500 rpm for 3 seconds, dried at 25° C. for 30 minutes, at 80° C. for 15 minutes, and then at 150° C. for 60 minutes, thereby to form a coated film 2 μm thick. The light transmittance and the haze value of coated film was found to be 89% and 0.1, respectively.

Comparative Example 1

The sixth step was not carried out in Example 1, and otherwise in the same manner as in Example 1, a dispersion of particles of rutile titanium oxide was obtained.

Comparative Example 2

The third step and the fourth step were not carried out in Example 1, and otherwise in the same manner as in Example 1, a dispersion of particles of rutile titanium oxide was obtained.

Comparative Example 3

50 parts by mole of acetic acid was added per 100 parts by mole of titanium oxide, and otherwise in the same manner as in Example 1, a dispersion of particles of rutile titanium oxide was obtained.

Comparative Example 4

The hydrothermal reaction was carried out at a temperature of 200° C. in Example 1, and otherwise in the same manner as in Example 1, a dispersion of particles of rutile titanium oxide was obtained.

Comparative Example 5

Commercially available fine particles of rutile titanium oxide (STR-100N manufactured by Sakai Chemical Industry Co., Ltd.) were repulped in water in an amount of 100 g/L in terms of titanium oxide. Nitric acid was added to the resulting slurry in an amount of 30 parts by mole per 100 parts by mole of titanium oxide to peptize the particles of titanium oxide. Zirconia beads having a diameter of 100 μm were added to the obtained slurry in the same volume as that of the slurry, and wet dispersion treatment was performed for 4 hours using a planetary ball mill, thereby an aqueous dispersion of particles of rutile titanium oxide was obtained.

The electric conductivity, the stability of the dispersion, and D50 and D90 of particles of rutile titanium oxide in the dispersion of particles of rutile titanium oxide obtained in each of Examples and Comparative Examples described above are shown in Table 1 and Table 2, together with the production conditions. Further, the weight loss on heating and the specific surface area of the particles of rutile titanium oxide obtained from the dispersion of particles of rutile titanium oxide obtained in each of Examples and Comparative Examples described above are shown in Table 2.

TABLE 1

| | Production of Dispersion | | | | | |
|---|---|---|---|---|---|---|
| | Chloride ion concentration at the time of hydrolysis in a first step (mole/L) | Organic acid[1] | Amount of organic acid added (parts by mole) | Peptizing acid[1] | Amount of peptizing acid added (parts by mole) | Temperature of hydrothermal reaction (° C.) |
| Example 1 | 8.3 | Acetic acid | 150 | Nitric acid | 30 | 150 |
| Example 2 | 8.3 | Acetic acid | 150 | Hydrochloric acid | 30 | 150 |
| Example 3 | 8.3 | Acetic acid | 90 | Nitric acid | 30 | 150 |
| Example 4 | 8.3 | Sodium citrate | 150 | Citric acid | 30 | 150 |
| Example 5 | 4.5 | Acetic acid | 150 | Nitric acid | 30 | 150 |
| Comparative Example 1 | 8.3 | Acetic acid | 150 | Nitric acid | 30 | 150 |
| Comparative Example 2 | 8.3 | None | — | Nitric acid | 30 | — |
| Comparative Example 3 | 8.3 | Acetic acid | 50 | Nitric acid | 30 | 150 |
| Comparative Example 4 | 8.3 | Acetic acid | 150 | Nitric acid | 30 | 200 |
| Comparative Example 5 | — | None | — | Nitric acid | 30 | — |

(Notes)
[1]The amount of organic acid and peptizing acid are each indicated by parts by mole per 100 parts by mole of titanium oxide ($TiO_2$)

TABLE 2

| | Properties of Dispersion | | | | Properties of Particles of Dispersion | |
|---|---|---|---|---|---|---|
| | D50 (nm) | D90 (nm) | Electric conductivity (mS/cm) | Dispersion stability[2] | Weight loss on heating (%) | Specific Surface Area ($m^2/g$) |
| Example 1 | 5 | 11 | 3.2 | Good | 4 | 140 |
| Example 2 | 6 | 13 | 4.0 | Good | 4 | 140 |
| Example 3 | 6 | 12 | 2.9 | Good | 4 | 142 |
| Example 4 | 8.5 | 22 | 3.2 | Good | 4 | 140 |
| Example 5 | 6 | 12 | 3.2 | Good | 4 | 126 |
| Comparative Example 1 | 24 | 47 | >100 | Bad | 4 | 140 |
| Comparative Example 2 | 7 | 19 | 3.2 | Good | 10 | 145 |
| Comparative Example 3 | 12 | 42 | 3.3 | Good | 4 | 130 |
| Comparative Example 4 | 15 | 45 | 3.1 | Good | 3 | 120 |
| Comparative Example 5 | >100 | >2000 | >100 | Bad | — | 100 |

(Notes)
[2]The dispersion stability was estimated to be "Good" when no precitation of particles was observed, and "Bad" when precipitation of particles was observed.

As apparent from the results shown in Table 1 and Table 2, the dispersions of particles of rutile titanium oxide obtained in accordance with the invention have a D50 within a range of 1 to 15 nm, preferably 5 to 10 nm, and a D90 of 40 nm or less, preferably 25 nm or less in particle size distribution; a specific surface area of particles of rutile titanium oxide within a range of 120 to 180 $m^2/g$; and a rate of weight loss of 5% or less when the particles of rutile titanium oxide are heated from 105° C. to 900° C.

The dispersions of particles of rutile titanium oxide obtained in accordance with the invention have particles of high crystallinity and excellent stability.

The invention claimed is:

1. A dispersion of particles of rutile titanium oxide in water wherein the particles of rutile titanium oxide have the following properties:
 a D50 in a range of 1 to 15 nm and a D90 of 40 nm or less in particle size distribution as determined by a dynamic light scattering method;
 a specific surface area in a range of 120 to 180 $m^2/g$ as determined by a BET method; and
 a rate of weight loss of 5% or less as determined by heating the particles of rutile titanium oxide from 105° C. to 900° C.

2. A dispersion of particles of rutile titanium oxide in water as a dispersion medium wherein the particles of rutile titanium oxide have the following properties:
 a D50 in a range of 1 to 15 nm and a D90 of 40 nm or less in particle size distribution as determined by a dynamic light scattering method;
 a specific surface area in a range of 120 to 180 $m^2/g$ as determined by a BET method; and
 a rate of weight loss of 5% or less as determined by heating the particles of rutile titanium oxide from 105° C. to 900° C.,
 wherein the dispersion of particles of rutile titanium oxide is obtained by a process comprising:
 a first step in which a chloride ion concentration of an aqueous titanium tetrachloride solution is adjusted to 4.4 mole/L or more and then is heated in a range between 86° C. to a boiling point to hydrolyze the titanium tetrachloride, wherein a slurry containing precipitated particles of rutile titanium oxide is obtained;
 a second step in which the slurry obtained in the first step is filtered and washed with water, wherein dissolved water-soluble salts are removed from the slurry;
 a third step in which the slurry from the second step is subjected to a hydrothermal reaction in the presence of an organic acid;
 a fourth step in which the slurry from the third step is filtered and washed with water, wherein dissolved water-soluble salts are removed from the slurry;
 a fifth step in which an acid is added to the slurry from the fourth step, and the resulting mixture is subjected to a wet dispersion treatment, wherein a dispersion is obtained; and
 a sixth step in which excess acid and water-soluble salts are removed from the dispersion obtained in the fifth step, thereby providing a dispersion of particles of rutile titanium oxide in which the dispersion medium is water.

3. The dispersion of particles of rutile titanium oxide in water according to claim 2, wherein the third step further comprises subjecting the slurry to a hydrothermal reaction in the presence of an organic acid in an amount of 75 parts by mole or more per 100 parts by mole of titanium oxide.

4. The dispersion of particles of rutile titanium oxide in water according to claim 2, wherein the sixth step further comprises removing excess acid from the dispersion so that the dispersion has an electric conductivity in a range of 1 to 5 mS/cm.

5. The dispersion of particles of rutile titanium oxide in water according to claim 2, wherein the hydrothermal reaction of the third step is carried out at a temperature in a range of 120-180° C.

6. The dispersion of particles of rutile titanium oxide in water according to claim 2, wherein the first step comprises adjusting the chloride ion concentration of the aqueous solution of titanium tetrachloride to 7.0 mole/L or more.

7. A resin composition comprising the dispersion of particles of rutile titanium oxide according to claim 1.

8. A process for producing a dispersion of particles of rutile titanium oxide according to claim 1, which comprises:
 a first step in which after a chloride ion concentration of an aqueous titanium tetrachloride solution is adjusted to 4.4 mole/L or more, the solution is heated at a temperature in a range of 86° C. to a boiling point to hydrolyze the titanium tetrachloride, thereby obtaining a slurry containing precipitated particles of rutile titanium oxide;
 a second step in which the slurry obtained in the first step is filtered and washed with water to remove water-soluble salts dissolved therein from the slurry;
 a third step in which the slurry obtained in the second step is subjected to a hydrothermal reaction in the presence of an organic acid;
 a fourth step in which the slurry obtained in the third step is filtered and washed with water to remove water-soluble salts dissolved therein from the slurry;
 a fifth step in which an acid is added to the slurry obtained in the fourth step, and the resulting mixture is subjected to a wet dispersion treatment, thereby obtaining a dispersion; and
 a sixth step in which excess acid and water-soluble salts are removed from the dispersion obtained in the fifth step.

9. The process for producing a dispersion of particles of rutile titanium oxide according to claim 8 wherein the slurry is subjected to a hydrothermal reaction in the presence of an organic acid in an amount of 75 parts by mole or more per 100 parts by mole of titanium oxide in the third step.

10. The process for producing a dispersion of particles of rutile titanium oxide according to claim 8 wherein excess acid is removed from the dispersion so that the dispersion has an electric conductivity in a range of 1 to 5 mS/cm in the sixth step.

11. The process for producing a dispersion of particles of rutile titanium oxide according to claim 8 wherein the hydrothermal reaction is carried out at a temperature in a range of 120-180° C. in the third step.

12. The process for producing a dispersion of particles of rutile titanium oxide according to claim 8 wherein the chloride ion concentration of an aqueous solution of titanium tetrachloride is adjusted to 7.0 mole/L or more in the first step.

* * * * *